United States Patent [19]

Bateman

[11] 4,312,042
[45] Jan. 19, 1982

[54] WEIGHT, BALANCE, AND TIRE PRESSURE DETECTION SYSTEMS

[75] Inventor: Charles D. Bateman, Bellevue, Wash.

[73] Assignee: Sundstrand Data Control, Inc., Redmond, Wash.

[21] Appl. No.: 102,776

[22] Filed: Dec. 12, 1979

[51] Int. Cl.³ .................................................. G01M 1/12
[52] U.S. Cl. .................................. 364/463; 364/567; 177/136; 73/65
[58] Field of Search ............. 364/463, 567; 177/136, 177/212; 73/65

[56] References Cited

U.S. PATENT DOCUMENTS

| | | | |
|---|---|---|---|
| 2,443,045 | 6/1948 | Magruder et al. | 73/65 |
| 2,453,607 | 11/1948 | Wardle et al. | 73/65 |
| 3,194,058 | 7/1965 | Kurkjian | 73/65 |
| 3,203,234 | 8/1965 | Westcott, Jr. et al. | 73/141 |
| 3,273,382 | 9/1966 | Fonash | 73/88.5 |
| 3,310,976 | 3/1967 | Bussell et al. | 73/65 |
| 3,473,369 | 10/1969 | Garrison | 73/65 |
| 3,488,997 | 1/1970 | Kliever | 73/65 |
| 3,499,500 | 3/1970 | Harding | 177/211 X |
| 3,513,300 | 5/1970 | Elfenbein et al. | 73/65 X |
| 3,584,503 | 6/1971 | Senour | 364/463 X |
| 3,638,211 | 1/1972 | Sanchez | 364/463 X |
| 3,638,477 | 2/1972 | Bruemmer | 73/65 |
| 3,650,340 | 3/1972 | Bradley | 177/136 |
| 3,701,279 | 10/1972 | Harris et al. | 177/136 X |
| 3,746,844 | 7/1973 | Axum et al. | 364/463 |
| 3,780,817 | 12/1973 | Videon | 177/136 |
| 3,802,523 | 4/1974 | Clark | 177/146 |
| 3,889,767 | 6/1975 | Scott et al. | 177/136 |
| 3,900,828 | 8/1975 | Lage et al. | 340/27 R |
| 4,006,347 | 2/1977 | Hohmann | 364/463 |
| 4,032,083 | 6/1977 | Maciolek | 364/463 X |
| 4,110,605 | 8/1978 | Miller | 364/463 |
| 4,123,933 | 11/1978 | Reid | 177/136 X |

FOREIGN PATENT DOCUMENTS 1226214 3/1971 United Kingdom ............... 177/136

*Primary Examiner*—Edward J. Wise
*Attorney, Agent, or Firm*—Wegner, Stellman, McCord, Wood & Dalton

[57] ABSTRACT

A weight and balance system for an aircraft or the like which measures the bend in a structural member of the aircraft, such as a landing gear element or a wing or fuselage section, by use of inclinometers mounted to the member and each having a signal output representing the angle of the member with respect to a reference plane and then summing signal outputs from the inclinometers to determine the angle of the bend which provides an indication of weight. In one example, the landing gear of the aircraft includes a member which bends in response to aircraft weight and a pair of inclinometers, in the form of servoed accelerometers, are mounted to the member adjacent opposite ends thereof and each provide a voltage output representing the angle of the member relative to the reference plane, and a summing device for summing said signal outputs as an indication of weight. For tire pressure detection, a plurality of inclinometers are associated with a bogie beam to determine which one of two or more pairs of tires is underpressured.

31 Claims, 8 Drawing Figures

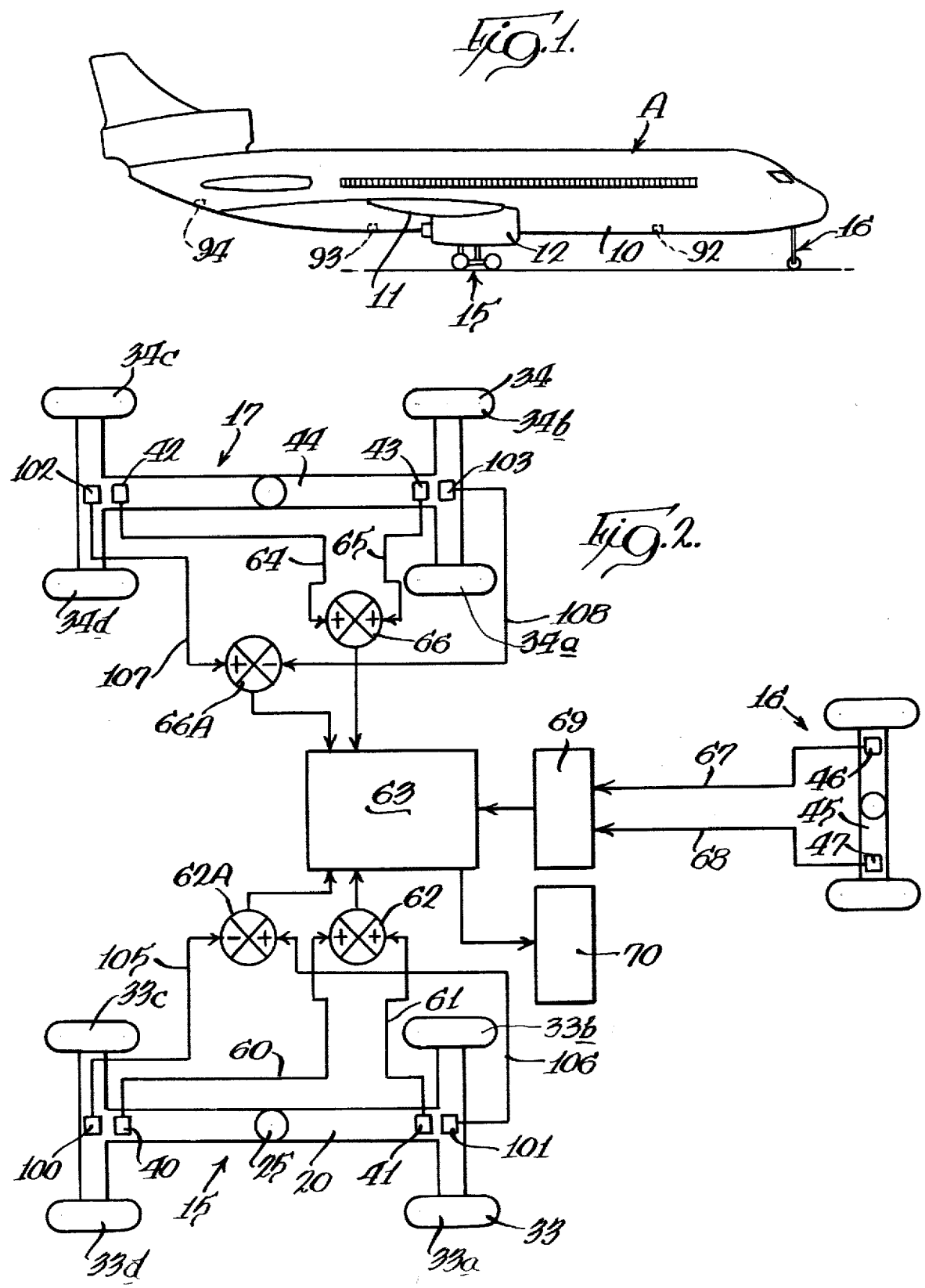

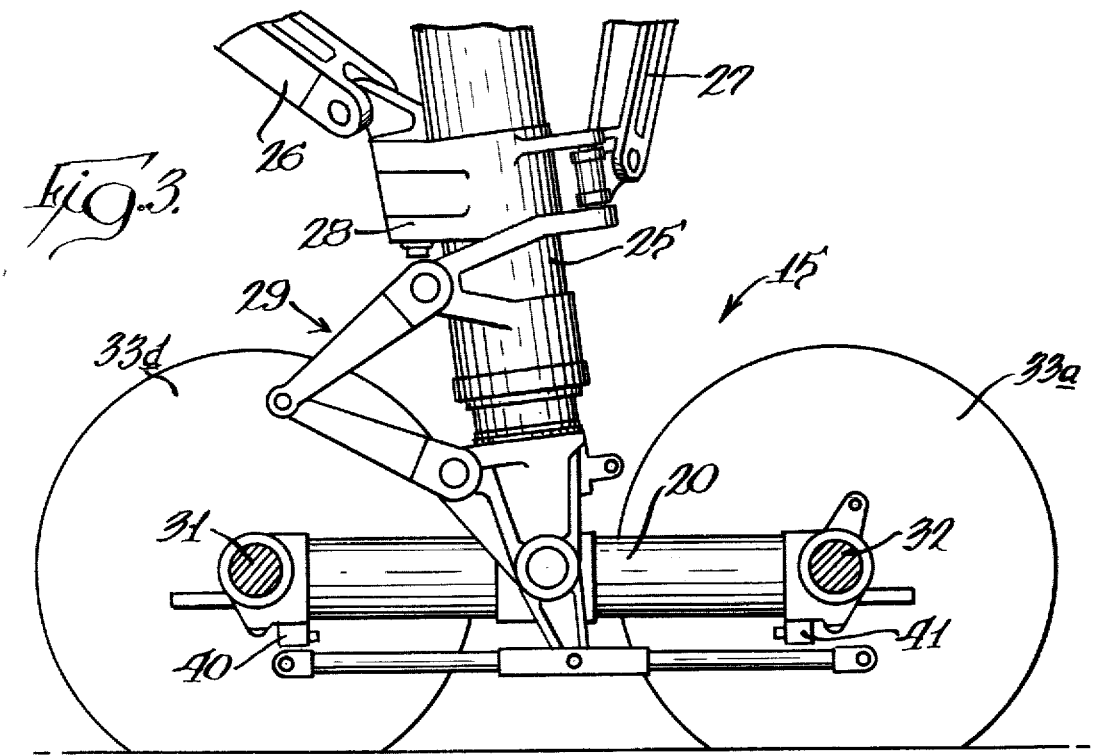
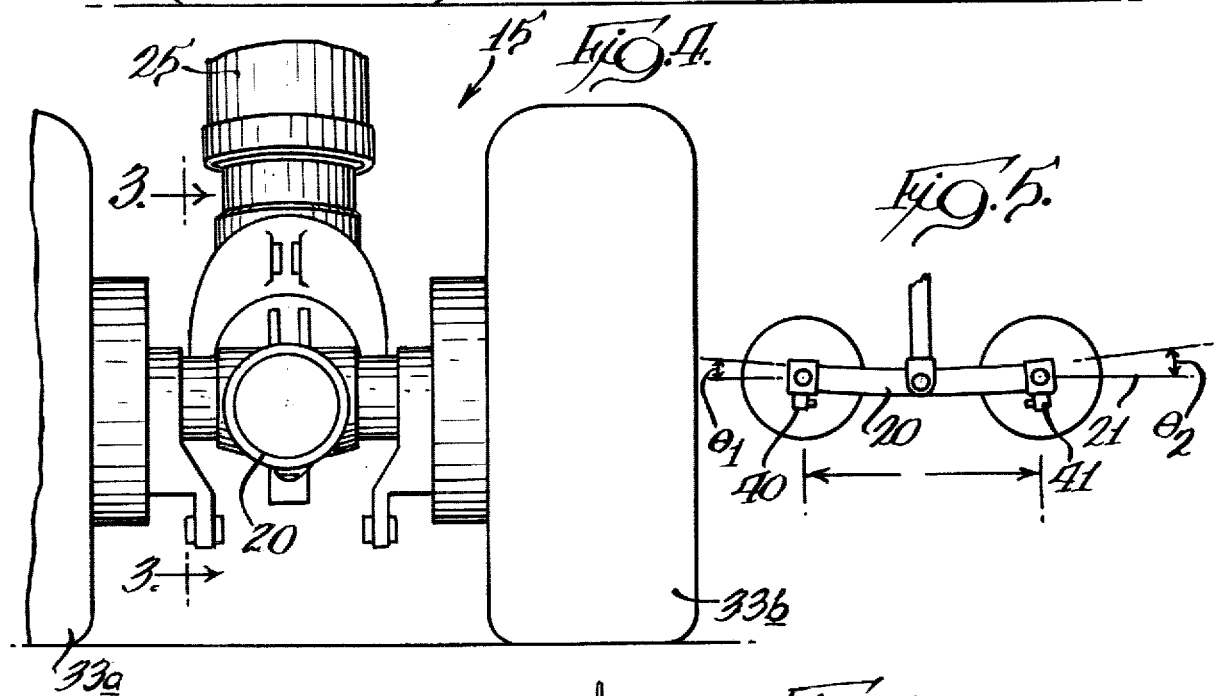
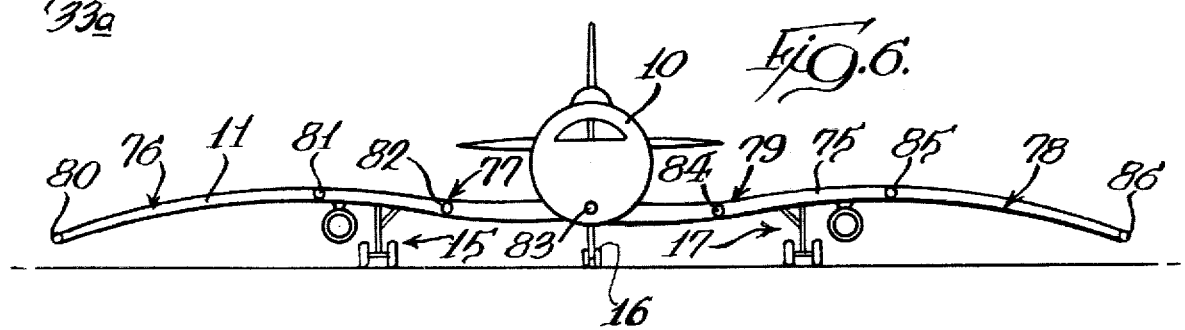

WEIGHT, BALANCE, AND TIRE PRESSURE DETECTION SYSTEMS

BACKGROUND OF THE INVENTION

This invention pertains to detection systems including a weight and balance system for an aircraft or the like which measures the bend in a member which is caused to bend by the weight on the aircraft by means of inclinometers and, more particularly, servoed accelerometers mounted to the member and which have signal outputs representing the angle of the member with respect to a reference plane and which are utilized to determine the angle of bend in the member as a indication of weight supported thereby.

A pilot in command of an aircraft must, before each flight, determine that the aircraft's weight and balance are within the safe operating limits or boundaries of the aircraft. This is typically accomplished by calculating the total airplane weight and the distribution of that weight in order to determine balance or center of gravity. The weight and balance determination is usually made by auditing a list of cargo, fuel, passengers, oil and crew members, there frequently being estimation of passenger and crew member weight and distribution thereof. Cargo may be actually weighed or estimated. Fuel weight is determined by quantity added to the aircraft and its temperature estimated to give an approximate fuel weight. All of this is then added to the basic empty weight and distribution of the empty weight of the aircraft as determined at either the date of manufacture or by subsequent weighing on scales.

Naturally, there are errors in such estimates and human calculations but, for the majority of flights, the built-in safety factors including extra runway length and better than minimum airplane performance and control are adequate to cover these errors. Even so, there have been many examples of past incidents and accidents where it was later determined that large errors in weight and balance were not detected by the pilots. In air freight operations, there is a large variation in loads, types of cargo, fuel and airport conditions whereby there is a much greater possibility for a serious error.

To further improve flight safety, an onboard weight and balance system allows the pilots to cross-check data on load and fuel normally provided by others. With sufficient accuracy and reliability, the onboard weight and balance system can be the primary instrument for the determination of weight and balance. The system can assist in positioning cargo at a more nominal balance point to reduce aerodynamic drag which results in economic savings because of reduced use of fuel with adequate flight control stability margins for the pilots.

In recent years, several onboard weight and balance systems have been developed for use on aircraft, including the use of strain gages and pressure and magnetic variable reluctance sensors. They have not measured up to expectations because of problems in stability, accuracy, reliability and ability to survive in a harsh environment. Because of these problems, many or most of these systems have been disconnected or removed.

An added safety factor in aircraft operation is a full complement of properly pressurized landing gear tires which has required visual inspection and which can be difficult to accomplish under conditions such as extreme winter weather.

SUMMARY OF THE INVENTION

A primary feature of the invention disclosed herein is to provide a weight and balance system which utilizes the angle of bend of a structural member as a direct indication of weight or load on the supported structure, such as an aircraft.

The weight and balance system utilizes inclinometers positioned to measure the angle of bending in a structural member, such as a bogie beam, axle or other structure, such as an aircraft wing or fuselage. The angle or bending is proportional to the weight or force on the structural member. The inclinometers provide output signals which can be summed to cancel out attitude and acceleration changes, whereby only the beam bend angle is obtained and which is a direct indication of the weight of the supported weight or load.

Various embodiments of the weight and balance system are disclosed and, in each embodiment, servoed accelerometers are used at spaced locations to provide voltage outputs which are summed to provide a signal indicative of the weight causing a predetermined bend angle in the structural member.

In one embodiment, the inclinometers are associated with the landing gear of the aircraft, including a pair of inclinometers mounted on a bogie beam member for each of the one or more main landing gears and a pair of inclinometers similarly mounted on the axle of the nose gear, whereby the sum of the signals from the various pairs of inclinometers provide an indication of aircraft weight.

In another embodiment and which may be in addition to that previously described, the inclinometers are arranged at various locations along the length of the aircraft wings and positioned relative to variable weight sections, such as fuel tanks, whereby the angle of bend of the wing can be determined and thereby the weight of fuel carried in a fuel tank.

Additionally, inclinometers can be located at various positions along the length of the fuselage of the aircraft to again determine bend angles at various locations and, thus, the location and weight of loads carried by the aircraft.

Still another feature of the invention is a low tire pressure detection system which utilizes the pair of inclinometers associated with the bogie beam, as previously mentioned, with subtraction of their signal outputs to determine a tilt of the bogie beam. An additional pair of inclinometers with orientation normal to said first pair can determine torsion in the bogie beam to locate a particular tire of a pair which is underpressure.

BRIEF DESCRIPTION OF THE DRAWINGS

FIG. 1 is a side elevational view of a typical aircraft with which the invention disclosed herein is associated;

FIG. 2 is a diagrammatic plan view of the aircraft landing gear and having a block diagram showing the control with sensor locations and computer interface therewith;

FIG. 3 is an enlarged elevational view, partly in section, of one of the main landing gear and taken along the line 3—3 in FIG. 4;

FIG. 4 is an end elevational view, looking toward the right-hand end, as shown in FIG. 3;

FIG. 5 is a diagrammatic view of the main landing gear shown in FIG. 3;

FIG. 6 is a front elevational view of the aircraft shown in FIG. 1;

DESCRIPTION OF THE PREFERRED EMBODIMENTS

Figure 7:
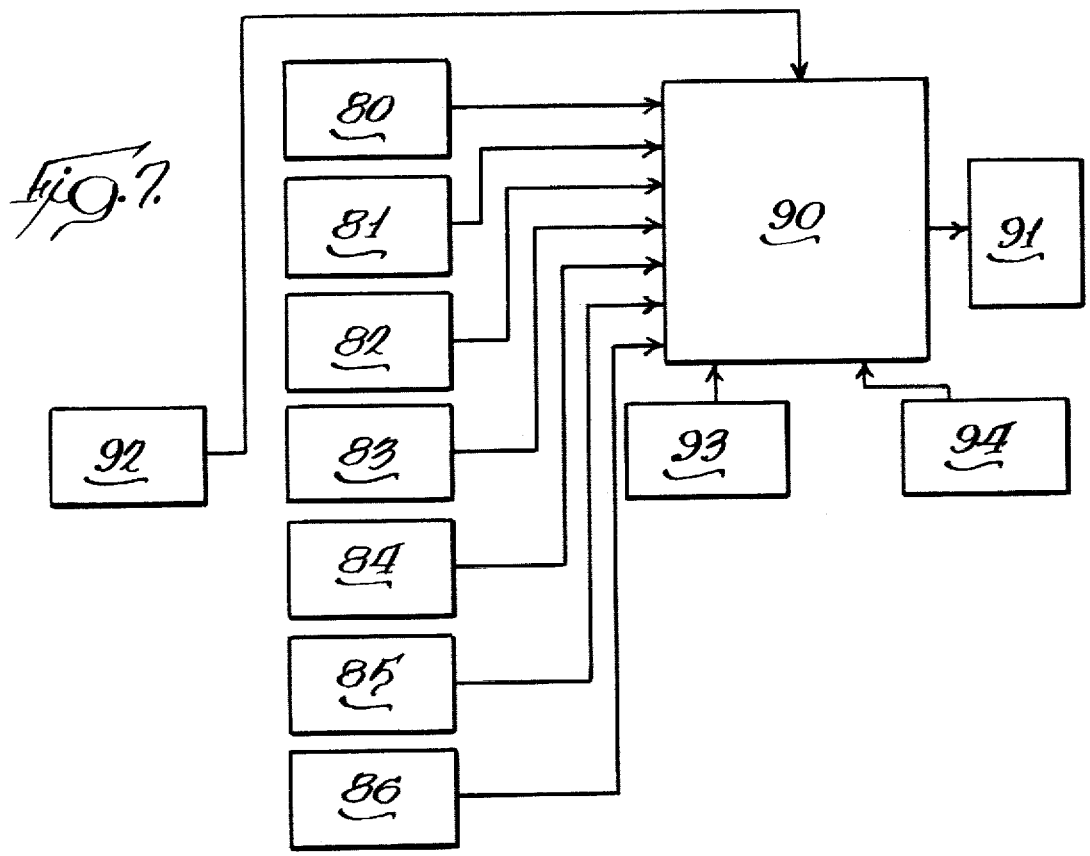
FIG. 7 is a block diagram of the part of the weight and balance system utilizing inclinometers associated with the wings and fuselage of the aircraft.

A first embodiment of the invention is shown in FIGS. 1 to 5 wherein the weight and balance system will determine aircraft weight and center of gravity by measuring the weight on each of the main landing gear and the nose gear.

The aircraft, indicated generally at A, is shown in a particular configuration only for purpose of illustration. The invention disclosed herein can be used with all types of aircraft now utilized, as well as many of those that will come into use in the future. The aircraft has a fuselage 10, with a pair of wings, the right wing being shown at 11, and mounting a jet engine 12. In the illustrated embodiment, the aircraft has main landing gear and nose gear, with one of the retractable main landing gear supported from the aircraft wing being identified at 15 and the nose gear at 16.

Referring more particularly to FIG. 2, the aircraft additionally has main landing gear 17.

The aircraft weight is determined by measuring the weight on each of the main landing gear and on the nose gear. This measurement is accomplished by sensing the amount of deflection or bend in the bogie beams of the main landing gear and by suitable means associated with the nose gear. This latter means can be accomplished by sensing the amount of deflection or bend in the axle of the nose gear.

The angle of bending of the structural member, such as the bogie beam, is proportional to the weight or force on the member. Referring to the schematic view of the main landing gear, shown in FIG. 5, a bogie beam 20 is shown with an exaggerated bend to illustrate the principle of the invention. An inertial reference plane is indicated by a horizontal, broken line 21. The angle of bending of the beam is represented by the reference angles $\theta_1$ and $\theta_2$. The angle $\theta$ for a uniform beam is a function of the displacement caused by the weight or force on the beam and the length of the beam. The angle of bending for a beam with uniform bending is four times the beam displacement divided by the length of the beam, while the angle for a beam with uniform cross section is three times the displacement divided by the length of the beam. Knowing the length of the beam and measuring the angle of bending, then provides an indication of displacement.

If the angle of bending is properly measured by sensing means providing an output representative of the angle, it is possible to use this angle along with a constant, which is the relationship of the load or weight deflection constant on the beam. This will depend on the beam material, its length to cross section ratio, its modulus of elasticity, as well as other factors. This constant will remain a fixed value as long as the beam load is kept within the linear yield or proportional limit of the beam and the beam is not deformed by other factors.

Measurement of the angle of bending is more particularly shown in FIGS. 2 to 5 wherein the main landing gear 15 and 17 each have a pair of inclinometers associated therewith. Referring particularly to FIGS. 3 and 4, the well-known type of main landing gear 15 has a retractable shock strut 25 which is retractably positionable within the envelope of the aircraft and which has a pair of braces 26 and 27 pivotally connected to a collar 28. A torque linkage, indicated generally at 29, has members pivotally interconnected. The lower end of the shock strut mounts a bogie beam 20 which, at opposite ends thereof, mounts transverse axles 31 and 32 which are shown in section and which mount the respective wheel assemblies 33 and 34 having pressurized tires 33a-d and 34a-d. The weight of the aircraft supported by the main landing gear 15 acts downwardly centrally of the bogie beam 20 to cause bending thereof in the manner shown in FIG. 5. This angle of bend is measured by a pair of inclinometers 40 and 41 which have their casings mounted to opposite ends of the bogie beam.

Each of the inclinometers 40 and 41 has a signal output representing the angle of the end of the beam relative to a horizontal reference plane perpendicular to the force of gravity. For reasons set forth hereinafter, the use of the inclinometers in pairs results in the summed output of the two inclinometers being an indication of angle of bend of the bogie beam regardless of the angle of the aircraft resulting from other factors, such as the tilt of an airport ramp or runway upon which the aircraft rests. The main landing gear 17 has a pair of inclinometers 42 and 43 mounted adjacent opposite ends of a bogie beam 44. The nose gear 16 is shown as having an axle 45 and with a pair of spaced-apart inclinometers 46 and 47 associated therewith. The inclinometers associated with the main landing gears and the nose gear sense the angle of the bogie beams or the axle with respect to an inertial reference.

Figure 8:
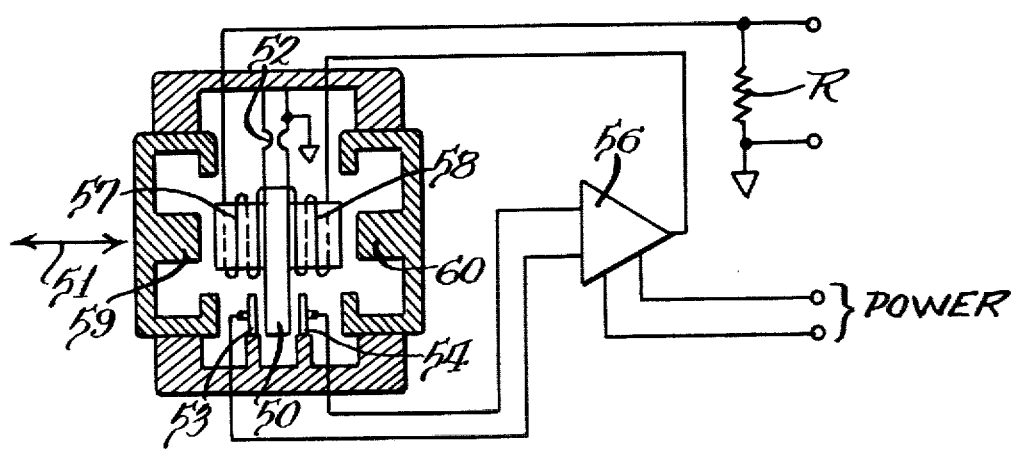
FIG. 8 is an electrical schematic of one of the servoed accelerometers, which is used as an inclinometer.

Servoed accelerometers are utilized as the inclinometers to provide the angle measurements, with the servoed accelerometer being a commercially-available product. The assignee of this application markets a Q-FLEX accelerometer which contains a seismic element and servo electronics all in one miniature package. This basic structure is disclosed in U.S. Pat. No. 3,702,073 and the disclosure thereof is incorporated herein by reference. The seismic assembly is electronically held in the center position to provide a high level voltage or current output. This gives an accurate and continuous measurement of the angle taken by the supporting structural member, such as the bogie beam. An electrical schematic for the servoed accelerometer is shown in FIG. 8. A pendulously-supported proof mass 50 has a high compliance along a sensitive axis, indicated generally at 51, as provided by a flexure mounting 52. Pick-off means, in the form of capacitors 53 and 54, are disposed at opposite sides of the proof mass 50 which causes the capacitance of one capacitor to increase and the other to decrease when the proof mass is subjected to acceleration. Through the servo system, indicated as 56 and as shown in FIG. 5 of the above-mentioned patent, a current is caused to flow through a pair of coils 57 and 58 which interacts with magnetic fields provided by magnets 59 and 60 to produce a force on the proof mass which counteracts the tendency of the values of the capacitances 53 and 54 to change. The signal voltage developed across the resistor R represents acceleration measured by the accelerometer and the voltage developed across the resistor R varies in proportion to the measured acceleration.

The accelerometer is rigidly attached to the associated structure, with the accelerometers 40 and 41, previously identified, being mounted at opposite ends of the bogie beam 20 and each having their sensitive axis 51 aligned with the axis of the beam with no load applied to the beam. The casing of the accelerometer fixedly mounted to the beam is caused to follow the angle of bend of the beam and the proof mass 50 of the accelerometer will give an indication of the inclination or actual angle relative to a plane which is perpendicular to the force of gravity. Similarly, accelerometers are used as inclinometers 42 and 43 associated with the bogie beam 44 and as the inclinometers 46 and 47 associated with the nose gear axle 45.

The angles $\theta_1$ and $\theta_2$ sense the angle of the supporting structure with respect to an inertial reference and with the sensed angles being defined as follows (Formulas 1 and 2):

$$\theta_1 = \theta_B + \theta_{L1} + \theta_{A1} \tag{1}$$

$$\theta_2 = -\theta_B + \theta_{L2} + \theta_{A2} \tag{2}$$

In the foregoing equations, $\theta B$ is the angle of the beam or axle caused by airport ramp or runway tilt. $\theta_{L1}$ and $\theta_{L2}$ are the beam bend angles caused by a load. $\theta_{A1}$ and $\theta_{A2}$ are sensor axis misalignment and bias terms.

Weight is given by the following formula:

$$W_T = K(\theta_{L1} + \theta_{L2})$$

From the foregoing, it will be seen that the weight on the beam is proportional to the $\theta_L$ components of the total measured angles. K is the scale factor which depends on beam or axle geometry and strength, as previously referred to. Referring to bogie beam 20, the outputs of the two servoed accelerometers 40 and 41 are summed to cancel out the beam angle $\theta_B$ caused by airport ramp or runway tilt and the angle factors $\theta_A$ are measured during automatic zeroing of the system. In summary, weight on the bogie beam or a nose gear axle is proportional to the sum of the output signals of the two accelerometers associated therewith.

Referring particularly to FIG. 2, the outputs of the inclinometers (servoed accelerometers) 40 and 41 are directed through lines 60 and 61 to a known type of means 62 for summing thereof such as a voltage summing circuit, with the output thereof directed to a computer 63. Similarly, the inclinometers 42 and 44 have their respective signal outputs delivered through lines 64 and 65 to a means 66 which performs a summing function and outputs to the computer 63. The inclinometers 46 and 47 associated with the nose gear axle have their signal outputs delivered through lines 67 and 68, respectively, to a means 69 performing a summing function which outputs to the computer 63. The computer 63 which can be a simple digital or analog computer determines the weight on each landing gear and the total weight of the aircraft and causes weight readings at a pilot display unit 70. The center of gravity can also be determined directly from the geometry of the aircraft and the weight on each of the landing gear using well known formulas for computing of the center of gravity of a body. Using the weights on the nose gear and main landing gear in a center of gravity formula that includes constants based on the airplane geometry, it is possible to have an output which indicates the center of gravity.

The embodiment shown in FIGS. 6 and 7 illustrates a weight and balance system where there is not suitable room or provision to install inclinometers on the landing gear as well as showing a technique which can be used to determine wing and tail loading as well as distribution of fuel and fuselage loads while airborne in addition to functioning as a weight and balance system. In this embodiment, servoed accelerometers, such as shown in FIG. 8, are used as inclinometers and are installed in the wings and fuselage. Enough accelerometers must be utilized to accurately determine various load distribution, such as can happen in wings having multiple fuel tanks.

Referring to FIG. 6, the aircraft has the right wing 11 previously identified and also a left wing 75, with the wings each having a pair of fuel tanks. The right wing 11 has fuel tanks in the areas indicated generally at 76 and 77 and the left wing 75 has fuel tanks indicated generally in the areas 78 and 79. It should be noted that the bend of the wing has been exaggerated for illustrative purposes.

For measuring wing loading in the example given, there are 7 accelerometers shown in association with the fuselage and wings and which are identified at 80–86.

Various deflection constants can be obtained by measuring the wing with various fuel loads and fuselage weight and accurately calculating the differential structure beam bend angles. The structural bend or beam angle across accelerometers 81 and 82 will be directly related by the fuselage weight times a constant, the fuel weight in tank located at 77 times a constant and the fuel weight in the tank located at 76 times a constant. As shown in FIG. 7, the outputs of the accelerometers 80–86 are fed to a summing and computer unit, indicated generally at 90, with the output thereof being delivered to a display unit 91.

Similarly, the fuselage bend can be measured and the load and its distribution determined by locating a plurality of accelerometers along the length of the fuselage and as indicated generally by accelerometers 92, 93, and 94 which all have their signal outputs delivered to the summing and computer unit 90.

It will be noted that the system shown in FIGS. 6 and 7 can be utilized while airborne to determine wing and tail loading and distribution of fuel and fuselage loads.

With the systems disclosed herein utilizing accelerometers offering long-term stability, infinite resolution, and eliminating many of the limitations of strain gages and various types of transducers, it is possible to have an onboard weight and balance system which can become a primary instrument for the determination of weight and balance. With such a system, there is improved flight safety as well as economic savings in operation because of controlling the location of cargo within the aircraft to reduce aerodynamic drag.

The weight and balance system has substantially all of the components required for low tire pressure or blown tire detection. The bogie beam tilt angle with respect to an inertial reference will be small if all tires are properly pressurized. A low tire will cause detectable bogie beam tilt and torsional twist. In a typical application, a 75% depressurized tire causes a bogie beam tilt of about 1.4° and a torsional twist angle of 0.5° on a level runway.

For weight and balance operation, the $\theta_B$ terms in previously given Formulas 1 and 2 were cancelled by summing $\theta_1$ and $\theta_2$. For low tire detection, however, the $\theta_B$ terms are of interest. By subtracting $\theta_2$ from $\theta_1$, the $\theta_B$ term can be measured:

$$\theta_1 - \theta_2 = 2\theta_B + \theta_{A1} - \theta_{A2}$$

$\theta_{L1}$ and $\theta_{L2}$ (bend angles caused by load) are equal and cancel out. $\theta_{A1} - \theta_{A2}$ is due to alignment error which the system will measure automatically.

Each of the main landing gears 15 and 17 (FIG. 2) has four tires 33a-d and 34a-d. The beam tilt angle ($\theta_B$) will identify which pair of tires (front or back) has a low tire. In order to determine which of the front tires or which of the rear tires (left or right) is low, two cross axis inclinometers 100,101 and 102,103 are installed on the respective bogie beams 20 and 44. One cross axis inclinometer is on the front of the beam and one is on the rear of the beam. The inclinometers 100-103 each have their sensitive axis at right angles to that of the adjacent inclinometers 40-43 and output through respective lines 105-108 to the computer 63. Means 62A and 66A include known circuitry for performing the subtraction function. A low tire will cause a torsional twist of the beam which can be measured by the cross axis inclinometers.

In practice, runway slopes and variations will impact the sensed bogie beam angles. The effects of runway slopes and variations are minimized in three ways. First, a fuselage mounted inclinometer senses runway slope so that its effect can be eliminated from the measurements. Second, the two bogie beam angles are compared so that variations between the two angles will be detected. Finally, the twist angles measured by the front and back lateral inclinometers on each bogie are compared so that the effects of lateral runway slopes will be minimized.

In summary, outputs of the system inclinometers can detect and identify blown or underpressured tires on the main landing gear.

I claim:

1. A weight measuring system for an aircraft having landing gear with a member which bends in response to aircraft weight comprising, a pair of inclinometers mounted to said member adjacent opposite ends thereof and each having a signal output representing the angle of the member with respect to a reference plane, and means for combining said signal outputs to generate a signal representative of aircraft weight on said member.

2. A weight measuring system as defined in claim 1 wherein said inclinometers are servoed accelerometers each having an electrical output representing the angle of said member relative to the direction of the force of gravity, and said combining means provides an output which represents the angle of bend of the member due to weight thereon regardless of the angle of the landing gear resulting from the tilt of an airport ramp or runway.

3. A weight and balance system for an aircraft or the like having a support which bends in proportion to the weight applied thereto comprising, a pair of members mounted one at each end of said support and each having means for measuring the angle of bend of said support, and means for determining the weight from the measured angle of bend of said support.

4. Weight and balance system as defined in claim 3 wherein said members are inclinometers each having a signal output, and said determining means is a summing means having the two signals as inputs.

5. Weight and balance system as defined in claim 4 wherein said inclinometers are servoed accelerometers.

6. A weight and balance system as defined in claim 4 wherein said summing means provides an output which represents the angle of bend of the support regardless of the tilt of the support relative to a horizontal plane.

7. A weight and balance system for an aircraft having landing gear including a nose gear with an axle member and at least one main landing gear having a bogie beam member and wherein said axle member and bogie beam member bend in a known manner relative to the aircraft weight supported thereby comprising, a pair of inclinometers mounted to each of said axle and said bogie beam members adjacent opposite ends thereof and each having a signal output representing the angle of the associated member with respect to the horizontal, and means for summing signal outputs of each pair of inclinometers as an indication of aircraft weight.

8. A weight and balance system as defined in claim 7 wherein said inclinometers are servoed accelerometers each having a voltage output representing the angle of said member relative to the force of gravity, and said summing means provides an output which represents the angle of bend of the member due to weight thereon regardless of the angle of the landing gear resulting from the tilt of an airport ramp or runway.

9. A weight measuring system for an aircraft which determines weight carried by a section of the aircraft by measuring the bend of a structural member associated with said section as caused by said carried weight comprising, a pair of inclinometers mounted to said section member at locations at opposite sides of said carried weight and each having a signal output representing the angle of the section member at said locations relative to a reference plane.

10. A weight measuring system as defined in claim 9 including means for comparing said signal outputs to determine the amount of bend in said section member which is caused by said carried weight.

11. A weight measuring system as defined in claim 10 wherein said comparing means is a means for summing said signal outputs.

12. A weight measuring system for an aircraft wing which extends outwardly from the aircraft fuselage and has fuel tanks comprising, a plurality of inclinometers mounted on said wing one at either side of said fuel tanks, said inclinometers each having a signal output representing the angle of the wing at the location of the inclinometer, and means for comparing said signal outputs to determine the bend of the wing between inclinometers as caused by the weight of fuel in said fuel tanks.

13. A weight measuring system for determining weight carried by an aircraft having a fuselage and a pair of wings extending therefrom with landing gear associated with each of said wings and said wings having fuel tanks comprising, a plurality of servoed accelerometers positioned relative to said fuselage and wings to have a pair of accelerometers mounted at opposite sides of each fuel tank and each landing gear and at said fuselage, each of said accelerometers having an electrical output representing the angle taken by that part of the aircraft to which the accelerometer is mounted, and means for comparing the outputs of the paired accelerometers to determine the bend of that part of the aircraft caused by carried weight.

14. A weight measuring system as defined in claim 13 wherein said servoed accelerometers have a proof mass which is pendulously supported.

15. A weight and balance system for an aircraft having landing gear including a nose gear with an axle member and at least one main landing gear having a bogie beam member and wherein said axle member and bogie beam member bend in a known manner relative to the aircraft weight supported thereby comprising, a plurality of servoed accelerometers each having a sensitive axis, a pair of said servoed accelerometers mounted to each of said axle and said bogie beam members adjacent opposite ends thereof with their sensitive axes in parallel with the axis of the associated member and each having a signal output representing the angle of the associated member with respect to the horizontal, and means for summing signal outputs of each pair of servoed accelerometers as an indication of aircraft weight.

16. A low tire detection system for an aircraft having at least one main landing gear having a bogie beam member and front and rear tires, a pair of inclinometers mounted to said bogie beam member adjacent opposite ends thereof with their sensitive axis parallel to the bogie beam member and each having a signal output representing the angle of the bogie beam member with respect to the horizontal, and means for subtracting signal outputs of each pair of inclinometers as an indication of tilt of the bogie beam member caused by one tire being improperly pressurized.

17. A system as defined in claim 16 wherein said inclinometers are servoed accelerometers each having an electrical output representing the angle of said bogie beam member relative to the force of gravity.

18. A low tire detection system for an aircraft having at least one main landing gear having a bogie beam member and front and rear pairs of tires comprising, a first pair of inclinometers mounted to said bogie beam member adjacent opposite ends thereof with their sensitive axis parallel to the bogie beam member and each having a signal output representing the angle of the bogie beam member with respect to the horizontal, means for subtracting signal outputs of said pair of inclinometers as an indication of tilt of the beam member, and a second pair of inclinometers mounted adjacent said first pair and having their sensitive axis normal to the sensitive axis of said first pair for detecting torsional twist of the bogie beam member.

19. A weight measuring system for a device having a member which bends in response to weight comprising, a pair of inclinometers mounted to said member adjacent opposite ends thereof and each having a signal output representing the angle of the member with respect to a reference plane, and means for combining said signal outputs to generate a signal representative of weight on said member.

20. A weight measuring system as defined in claim 19 wherein said inclinometers are servoed accelerometers each having an electrical output representing the angle of said member relative to the direction of the force of gravity, and said combining means provides an output which represents the angle of bend of the member due to weight thereon regardless of the tilt of the member relative to a horizontal plane.

21. A weight and balance system for a device having a support which bends in proportion to the weight applied thereto comprising, a pair of members mounted one at each end of said support and each having means for measuring the angle of bend of said support, and means for determining the weight from the measured angle of bend of said support.

22. Weight and balance system as defined in claim 21 wherein said members are inclinometers each having a signal output, and said determining means is a summing means having the two signals as inputs.

23. Weight and balance system as defined in claim 22 wherein said inclinometers are servoed accelerometers.

24. A weight and balance system as defined in claim 22 wherein said summing means provides an output which represents the angle of bend of the support regardless of the tilt of the support relative to a horizontal plane.

25. A weight measuring system for a vehicle having a member which bends in response to weight comprising, a pair of inclinometers mounted to said member adjacent opposite ends thereof and each having a signal output representing the angle of the member with respect to a reference plane, and means for combining said signal outputs to generate a signal representative of weight on said member.

26. A weight measuring system as defined in claim 25 wherein said inclinometers are servoed accelerometers each having an electrical output representing the angle of said member relative to the direction of the force of gravity, and said combining means provides an output which represents the angle of bend of the member due to weight thereon regardless of the tilt of the member relative to a horizontal plane.

27. A weight and balance system for a vehicle having a support which bends in proportion to the weight applied thereto comprising, a pair of members mounted one at each end of said support and each having means for measuring the angle of bend of said support, and means for determining the weight from the measured angle of bend of said support.

28. Weight and balance system as defined in claim 27 wherein said members are inclinometers each having a signal output, and said determining means is a summing means having the two signals as inputs.

29. Weight and balance system as defined in claim 28 wherein said inclinometers are servoed accelerometers.

30. A weight and balance system as defined in claim 28 wherein said summing means provides an output which represents the angle of bend of the support regardless of the tilt of the support relative to a horizontal plane.

31. A low tire detection system for a vehicle having front and rear pairs of tires and a member between the pairs of tires comprising, a first pair of inclinometers mounted to said member adjacent opposite ends thereof with their sensitive axis parallel to the member and each having a signal output representing the angle of the member with respect to the horizontal, means for subtracting signal outputs of said pair of inclinometers as an indication of tilt of the member, and a second pair of inclinometers mounted adjacent said first pair and having their sensitive axis normal to the sensitive axis of said first pair for detecting torsional twist of the member.

* * * * *